Oct. 13, 1953     L. BRAUN     2,655,585
WELDING MACHINE
Filed June 29, 1950     6 Sheets-Sheet 1
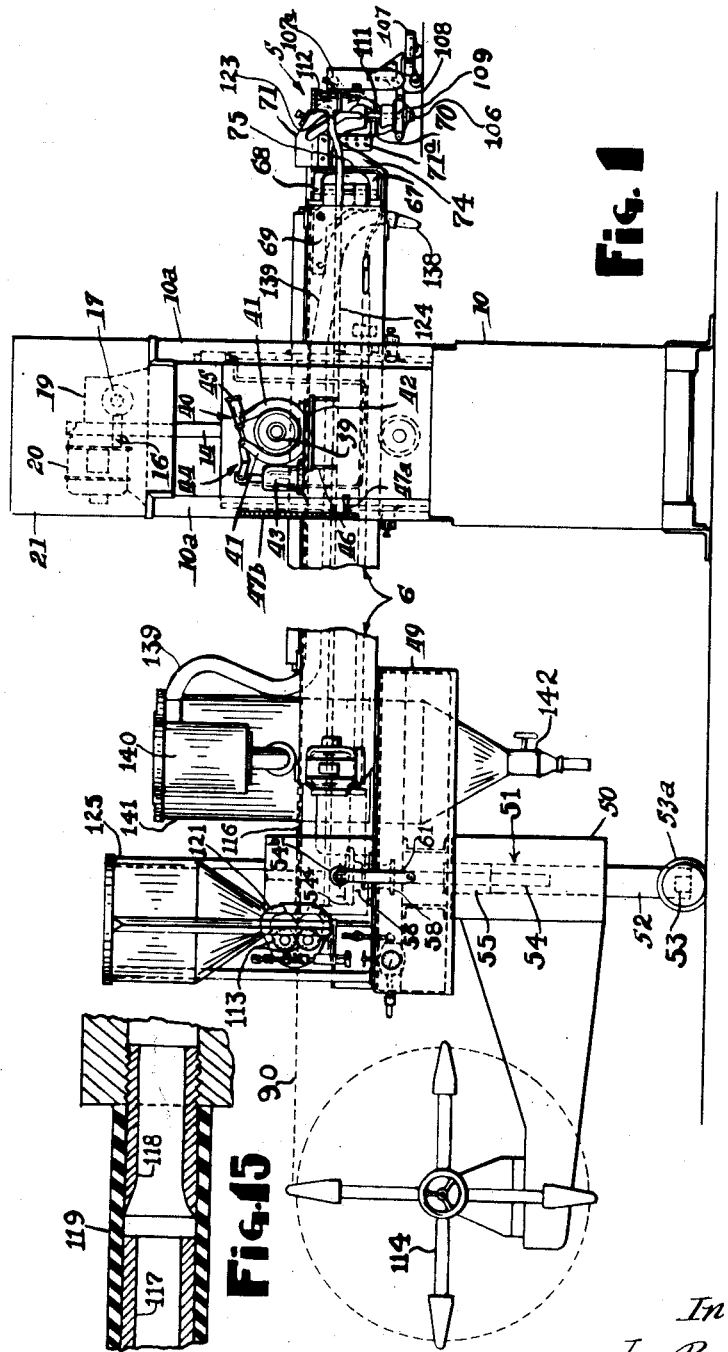
Inventor
L. Braun
By Fetherstonhaugh & Co.
Attorneys

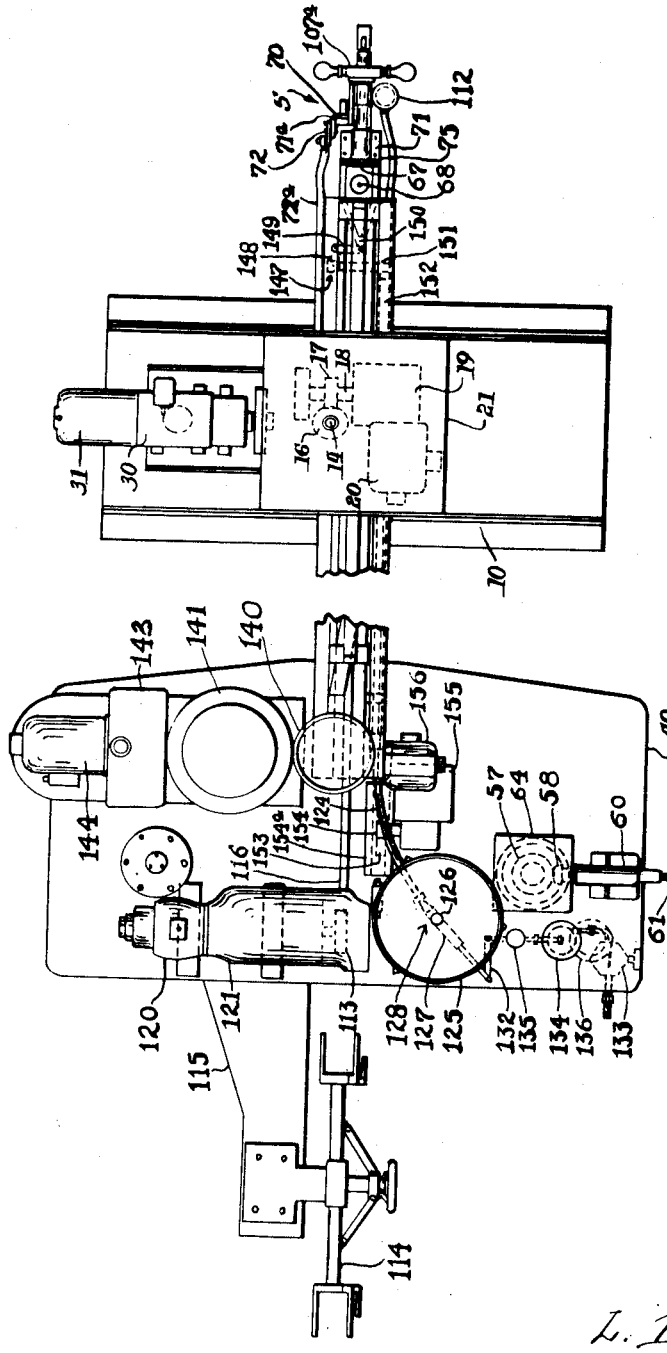

Oct. 13, 1953      L. BRAUN      2,655,585
WELDING MACHINE
Filed June 29, 1950      6 Sheets-Sheet 3
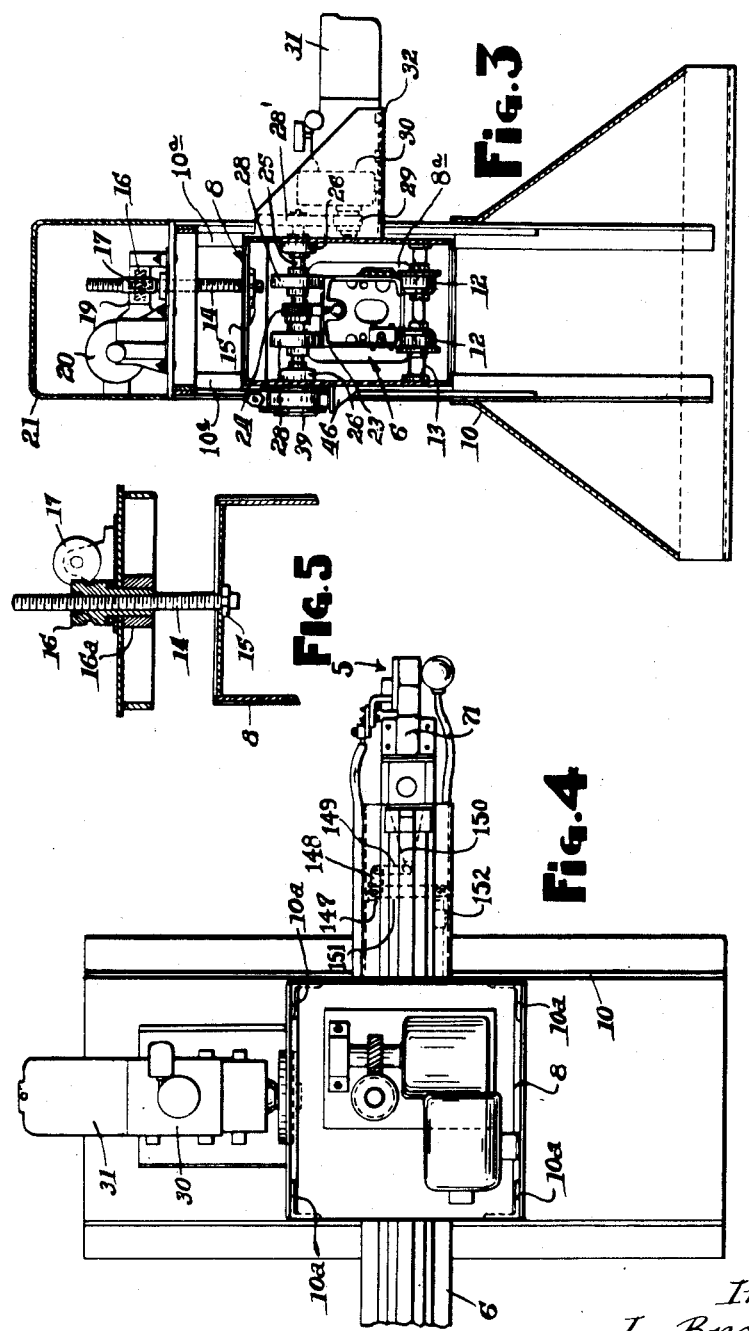
Inventor
L. Braun
By Fetherstonhaugh & Co.
Attorneys Oct. 13, 1953     L. BRAUN     2,655,585
WELDING MACHINE Filed June 29, 1950     6 Sheets-Sheet 4

Inventor
L. Braun.
By Fetherstonhaugh & Co.
Attorneys

Oct. 13, 1953 L. BRAUN 2,655,585
WELDING MACHINE
Filed June 29, 1950 6 Sheets-Sheet 6

Inventor
L. Braun
By Fetherstonhaugh & Co.
Attorneys

Patented Oct. 13, 1953

2,655,585

UNITED STATES PATENT OFFICE 2,655,585

WELDING MACHINE

Leo Braun, Montreal, Quebec, Canada, assignor to Dominion Bridge Company Limited, Montreal, Quebec, Canada Application June 29, 1950, Serial No. 171,001

14 Claims. (Cl. 219—8)

This invention relates to an improved welding machine especially adapted for the inside welding of longitudinal and circumferential seams of elongated, tubular bodies.

One object of the invention is the provision of a generally improved welding machine whereby the longitudinal and/or circumferential seam welding of articles of widely varying thickness may be efficiently accomplished at widely varying welding speeds by the flux submerged arc welding process.

Another object of the invention is to provide a welding machine in which the major components are electrically actuated so that the machine lends itself to the use of electrical controls for effecting automatic operation of the various electrically actuated components in proper sequence and also lends itself to remote manual control of certain of said components by the operator as he follows the progress of the welding operations.

Another object of the invention is to provide a welding machine of the type specified in which the welding current is supplied to the welding electrode close to the welding point through the agency of contact shoes carried by a bus bar to which the welding current cables are connected, said bus bar forming part of a welding head assembly including an electrode bending head through which the electrode is fed between the contact shoes to the work, the bending head including electrode bending and straightening rollers which are insulated from the bus bar and the contact shoes.

Another object is to provide a welding machine in which the assembly including the bus bar, the contact shoes and the bending head also includes a flux distributing spout through which the electrode is fed from the contact shoes to the work and in which the flux is supplied to said spout through a flux nozzle positioned immediately above the spout.

Another object is to provide a completely pneumatic flux feed system for supplying flux from a flux storage tank to said flux nozzle.

A further object is to provide a welding machine in which the welding head assembly is carried by a vertically and longitudinally movable beam and in which motor actuated means are provided for imparting longitudinal travelling movement to the beam at a controlled rate of speed and for adjusting the beam vertically in relation to the work for ensuring sufficient submergence of the arc by the flux.

Another important feature of the invention consists in the provision of a portable control panel which may be propelled to any desired position by the operator as he follows the progress of the welding operation and which contains the electrical control for the various components of the machine, together with manually operable devices for predetermining or changing the setting of said controls.

Other objects, characteristic features and advantages of the invention will be set forth or made apparent by the following detailed description of the accompanying drawings, in which—

Fig. 1 is a side elevational view of my improved welding machine.

Fig. 2 is a plan view of said machine.

Fig. 3 is a vertical sectional view.

Fig. 4 is an enlarged plan view of the welding head end of said machine.

Fig. 5 is a detail view.

Fig. 12 is an enlarged sectional view of a flux feeding nozzle forming part of the flux feeding system shown in Fig. 8.

Fig. 13 is a perspective view of the portable control panel.

Fig. 15 is a sectional detail view showing part of a guide conduit through which the welding electrode is fed to the welding head assembly.

Figure 6:
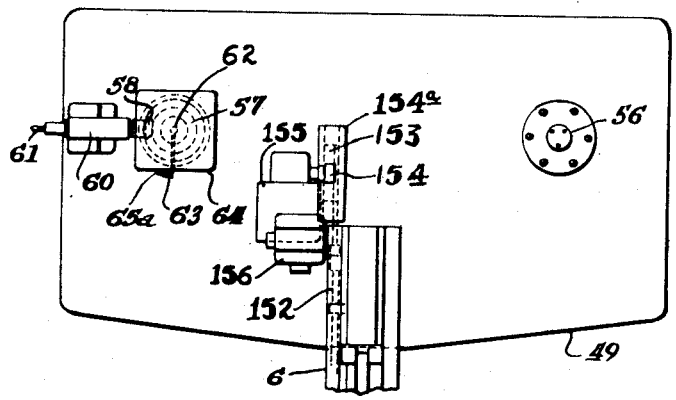
Fig. 6 is a plan view of the end portion of the machine remote from the welding head assembly.

As shown in these drawings, my improved welding machine includes a welding head assembly 5 supported by the front end of a travelling beam 6 which is vertically adjustable to position the welding electrode, hereinafter referred to, at the optimum distance from the work and which, during longitudinal seam welding operations, is operated to move the welding head assembly and the electrode along the length of the seam.

The beam 6 is of hollow construction and travels through the central opening 8a (Fig. 3) of a vertically adjustable beam-supporting frame 8 which is guided in its vertical movement by guide members 10a forming the upper part of a stationary frame 10. Frame 8 is equipped with flanged guiding and supporting rollers 12 on which beam 6 travels, said rollers being mounted on a shaft 13 carried by frame 8. Frame 8 is raised and lowered by vertical movement of a vertically disposed screw 14 having its lower end suitably clamped to said frame as indicated at 15. A spiral gear 16 journalled in thrust bearing 16a (Fig. 5) is threaded onto the upper portion of screw 14 and is driven by a spiral gear 17 fixed to the output shaft 18 of a speed reduction unit 19 which is driven by an electric motor 20. When motor 20 is operated to drive gears 17 and 16, the screw 14 and beam-supporting frame 8 will be raised or lowered with reference to the supporting frame 10 and the work depending upon the direction in which the gear 16 is rotated. The gears 16 and 17, speed reducing unit 19 and motor 20 are supported by the guide members 10a of frame 10 and are enclosed by a suitable cover 21.

Horizontal travelling movement is imparted to beam 6 by propelling mechanism including a rack 23 (Fig. 3) which is secured to the upper surface of the beam and is driven by a pinion 24 fixed to a shaft 25 journalled in frame 8 by suitable bearings 26. Shaft 25 is also equipped with idler rolls 28 flanking the pinion 24 and bearing on the upper surface of the beam to assist in guiding the latter in its horizontal movement. One end of shaft 25 is provided with a gear 28′ driven by a pinion 29 on the output shaft of a variable speed transmission unit 30 which, in turn, is driven by an electric motor 31. The transmission unit 30 and motor 31 are mounted on a suitable supporting bracket 32 attached to frame 8. The end of shaft 25 remote from gear 28 is equipped with a brake drum 39 forming part of a conventional solenoid brake assembly generally indicated at 40. As shown in Fig. 1, this brake assembly includes brake shoes 41 pivotally secured at their lower ends to base structure 42 which also carries an operating solenoid 43 which is connected to the upper ends of the brake shoes by the linkage 44 and the spring device 45. The brake assembly 40 is mounted on a shelf bracket 46 carried by the frame structure 8.

A suitable level indicator is provided for indicating the level to which the front end of beam 6 is raised or lowered by vertical movement of the adjustable supporting frame 8. As here shown, this indicator comprises a pointer 47a (Fig. 1) carried by frame 8 and movable along a scale 47b carried by one of the guide members 10a along which the frame 8 is slidable.

The rear end of beam 6 is rigidly secured to a supporting platform 49 carried by a vertically adjustable frame 50 provided with tubular guides 51. The guides 51 are located adjacent opposite sides of frame 50 and are slidably fitted on vertically extending supporting legs 52 having their lower ends fastened to an axle 53 equipped with ground wheels 53a. The platform 49 and its supporting frame 50 are raised and lowered with reference to the legs 52 by mechanism including a pair of vertically extending screws 54 extending downwardly in threaded engagement with nuts 55 rigidly secured to the upper ends of the legs 52. The upper ends of screws 54 are unthreaded and are rotatably mounted in combined thrust and radial bearings 56 carried by platform 49. The screws 54 are geared together for simultaneous rotation by means of an endless chain 57 trained around sprockets 58 rigidly secured to said screws. One of the screws 54 is provided, at its upper end, with a bevel gear 54a driven by a bevel pinion 54b fastened to one end of a shaft 59 journalled in a bearing bracket 60 mounted on platform 49. The other end of shaft 59 is equipped with a crank handle 61. When it is desired to raise or lower the rear end of beam 6 to compensate for vertical adjustment of the front end of said beam this is accomplished by operating shaft 59 through the agency of crank handle 61 to cause the screws 54 to rotate in the nuts 55 and to travel vertically with reference to the supporting legs 52, thus raising or lowering the platform 49.

Figure 14:
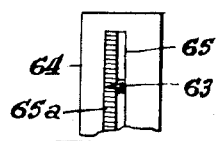
Fig. 14 is a detail view of an elevation indicating device associated with the mechanism for elevating the rear end of the beam carrying the welding head assembly.
Figure 7:
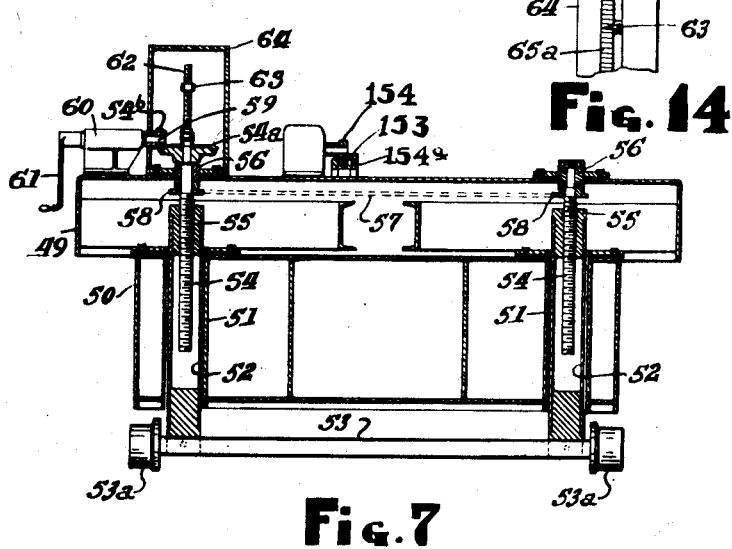
Fig. 7 is a vertical sectional view of the assembly shown in Fig. 6.

The screw 54 which is driven by the bevel gear 54a and pinion 54b is provided with an extension screw 62 (Figs. 6, 7 and 14) carrying a screw-threaded indicator pointer 63 which is enclosed by a casing 64 and travels along a slot 65 provided in said casing. The casing 64 is provided, at one side of slot 65, with a graduated scale 65a which cooperates with the pointer 63 to indicate the different elevations to which the platform 49 and the beam 6 are adjusted by means of the screws 54.

Figure 9:
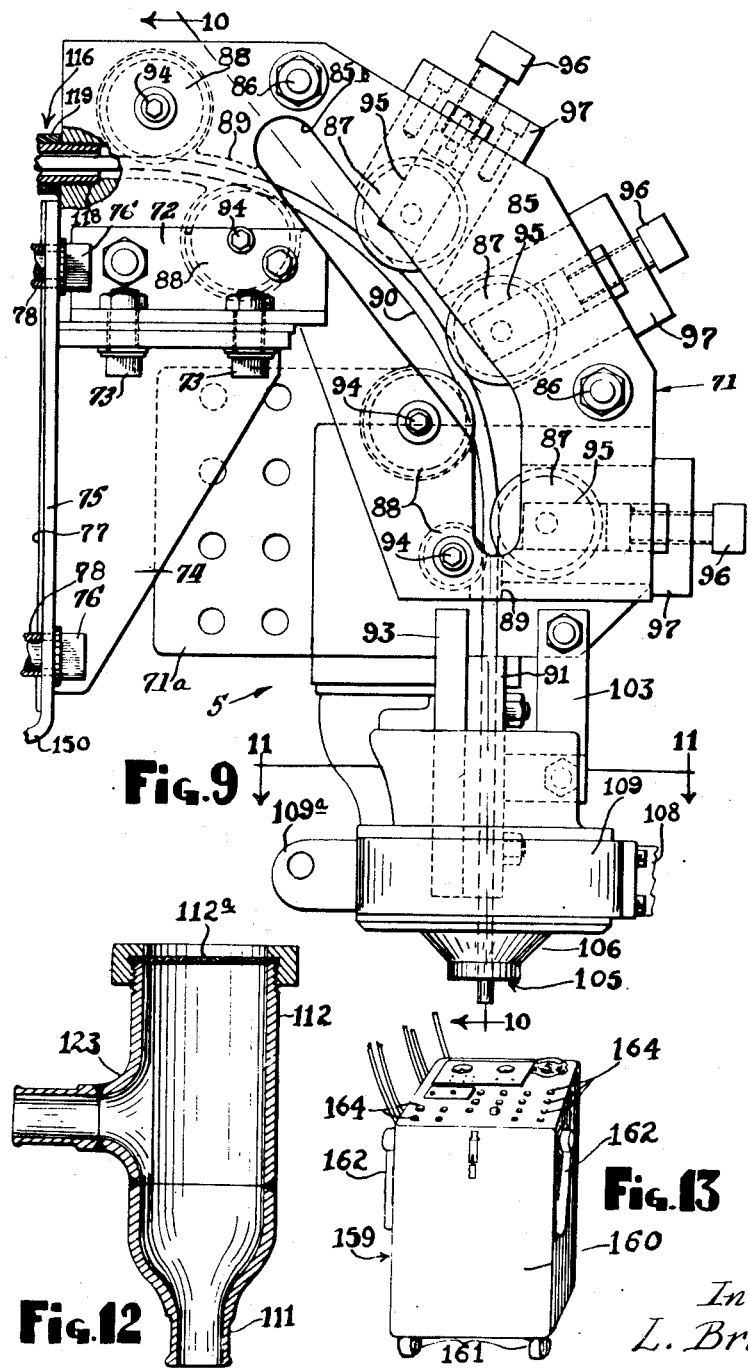
Fig. 9 is an enlarged side elevation of the welding head assembly.
Figures 10, 11:
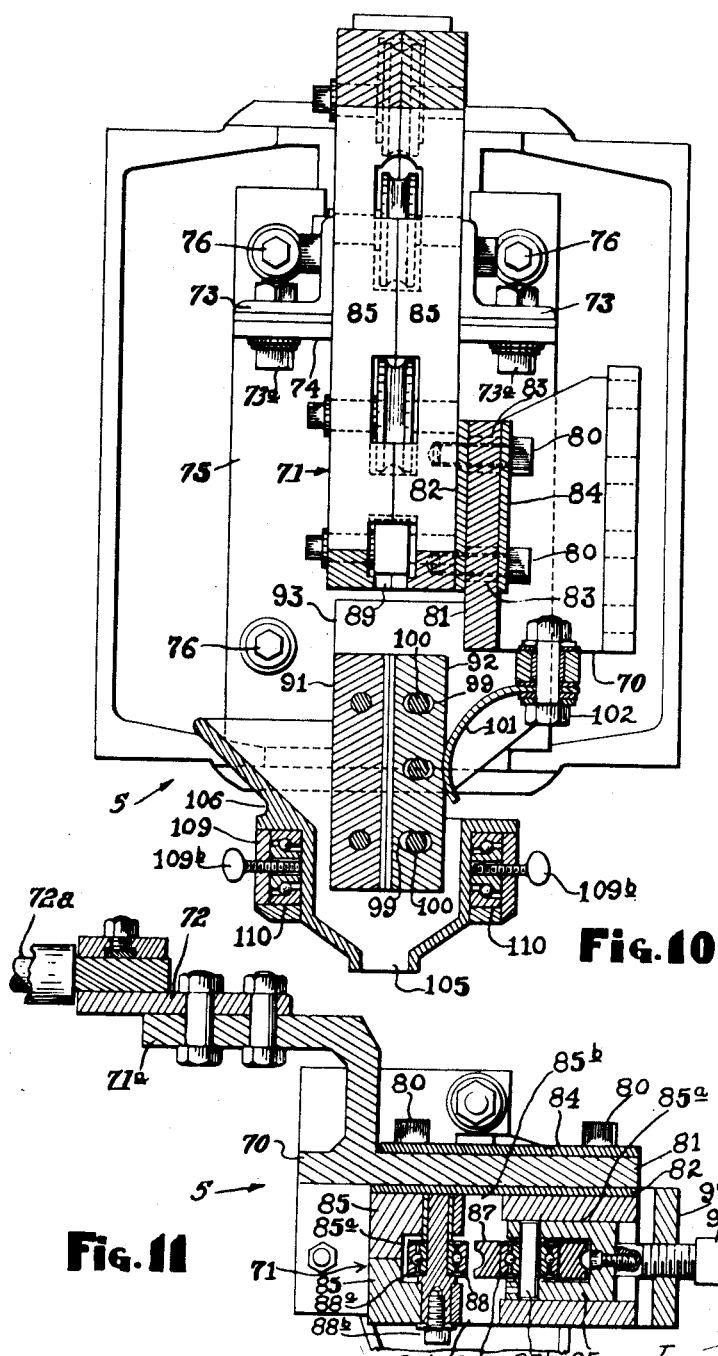
Fig. 10 is a sectional view taken substantially along the section line 10—10 of Fig. 9.
Fig. 11 is a sectional view taken substantially along the section line 11—11 of Fig. 10.

The welding head assembly 5 includes a supporting yoke 67 which is fastened by a vertical pivot 68 to a bracket 69 carried by the front end of beam 6. The welding head assembly is thus pivotally supported to provide for necessary lateral adjustment of the discharge end of the electrode. The welding head assembly 5 also comprises a conducting bracket 70 including a bus bar 71a to which the terminals 72 of welding conductors 72a (Fig. 11) are directly secured. Bracket 70 is supported by an electrode bending head 71 (Figs. 1, 9, 10 and 11) which is fastened by angle plates 73 and bolts 73a to a bracket 74 carried by a plate 75 which is bolted to yoke 67 by bolts 76 (Figs. 9 and 10). The plate 75 is insulated from the yoke 67 by interposed insulation 77 and the bolt connections 76 are also insulated by suitable insulating bushing indicated at 78. The lower portion of the electrode bending head 71 is fastened by studs 80 to one side of a plate portion 81 of bracket 70. The bending head 71 is insulated from the plate portion 81 of bracket 70 by interposed insulation 82 and the studs 80 are also insulated from plate portion 81 of bracket 70 by the insulated bushings 83 and insulating strip 84. The electrode bending head 71 is divided into two half sections 85 which are bolted together in face to face relation by bolt connections 86. The opposing surfaces of the two halves 85 of the bending head 71 are recessed to accommodate the electrode bending rollers indicated at 87 and 88 and to provide an electrode guide passage 89 through which the electrode 90 is passed to and between contact jaws 91 ad 92 which are positioned below the delivery end of electrode guide passage 89. The jaws 91 and 92 are carried by a supporting member 93 of bracket 70.

The electrode bending rollers 88 are arranged in the bending head 71 at one side of guide passage 89 and are mounted to revolve about fixed axes 94. The rollers 87 are mounted on the opposite side of electrode guide passage 89 and certain of these last mentioned rollers are journalled in bearing blocks 95 which are slidable inwardly and outwardly with reference to the rollers 88 by means of adjusting screws 96 threaded through suitable brackets 97 fastened to bending head 71.

The two halves 85 of bending head 71 are recessed, as indicated at 85a in Fig. 11, to accommodate the rollers 87 and 88 and the bearing blocks 95 in which certain of the rollers 87 are journalled. The two halves of bending head 71 are also provided with registering slots 85b which intersect the electrode passage 89 and expose the inner peripheral portions of certain of the rollers 87 and 88 between which the electrode is passed. The slots 85a give access to the electrode 90 to facilitate the initial threading of the electrode between the rollers 87 and 88 of the bending head. As shown more particularly in Fig. 11, the rollers 87 are mounted by means of anti-friction bearings 87a on shafts 87b carried by the blocks 95. The rollers 88 are mounted by means of ball bearings 88a on shafts 88b mounted in suitable bearings carried by the two halves of bending head 71. At this point it may be noted that the insulation of the bending rollers 87 and 88 and the bending head 71 from the bus bar 71a and the contact jaws 91 and 92 is an important feature of the invention which avoids the heating of the rollers and the resulting lubrication and other difficulties which arise when the welding current is transmitted to the electrode through the rollers in accordance with previous practice.

The contact jaw 91 is rigidly secured to the jaw-supporting member 93 while the contact jaw 92 is mounted on the supporting member 93 so that it is capable of lateral movement with respect to jaw 91. In this connection it will be noted that jaw 92 is provided with slots 99 in which supporting studs 100 are fitted so that jaw 92 is thus mounted for lateral movement toward and away from jaw 91. Jaw 92 is normally urged into contact with jaw 91 by a biasing spring 101 having one end fitted against said jaw and the other end fastened to the bracket 70 by a bolt connection 102. Jaw 92 is also electrically connected to bracket 70 by a strap or braid connection indicated at 103 in Fig. 9.

After the electrode 90 has been threaded through guide passage 89 of bending head 71 and properly deflected by the bending action of the rollers 87 and 88 it is directed downwardly between the contact jaws 91 and 92 and through the bottom opening 105 of a flux spout 106 surrounding said jaws.

In carrying out certain longitudinal seam welding operations it is desirable to provide the welding head assembly with an electrode guide carriage 107 which tracks in the seam being welded and serves to automatically swing the welding head assembly about its pivot 68 to maintain the discharge end of electrode 90 properly centered with respect to the seam. As here shown carriage 107 is connected by an arm 108 to a spout-encircling collar 109 which, as shown in Fig. 10, is rotatably mounted on the spout by suitable ball bearings indicated at 110. The welding head assembly 5 is equipped with a conventional Crouse-Hinds vapor type lighting condulet indicated at 107a in Figs. 1 and 2. In those cases in which the electrode guide carriage is replaced, as hereinafter described, by motor operated means for swinging the welding head assembly about its pivot 68, the electrode guide carriage 107 is removed by detaching the arm 108 from the spout-encircling collar 109. The latter is then turned through an angle of 180° from the position shown in Figs. 1 and 9 to position a collar carried lug 109a at the front of the collar so that a pointer (not shown) may be suitably clamped to this lug to provide a convenient means for indicating whether or not the discharge end of the electrode is properly centered with respect to the longitudinal seam being welded. After the collar 109 has been turned through an angle 180° as described, it is locked against rotation relative to spout 106 by means of locking screws 109b (Fig. 10) which are carried by the collar and are screwed inwardly into jamming engagement with the collar encircling portion of spout 106.

The flux in which the arc is submerged during welding is supplied to spout 106 through the outlet 111 of a flux nozzle 112 which is carried by the bending head 71.

The electrode 90 is fed to the bending head 71 from a supply reel 114 supported by a bracket 115 carried by the supporting frame 50 of platform 49. The electrode is drawn from the reel by a pair of feed rollers 113 which feed the electrode through a guide conduit 116 having its discharge end connected to the inlet end of the electrode guide passage 89 of bending head 71. As shown in Fig. 15 the electrode guide conduit comprises a pair of axially aligned metal tubes 117 and 118 which are flexibly connected together and insulated from the beam 6 by means of an enclosing flexible insulating tube 119 made of rubber or other suitable insulating material. One end of the metal tube 118 is rigidly secured to the bending head 71. The other end of tube 118 is flared and spaced from the adjacent end of tube 117 with the gap between the opposing ends of the tube bridged by a portion of the flexible insulating tube 119. This arrangement permits angular lateral movement of tube 118 relative to the tube 117 during swinging movement of the welding head assembly 5 about its vertical axis 68. The end of tube 117 remote from tube 118 is positioned relatively close to the feed rolls 113 which are driven by a motor 120 and a gear reduction unit 121 mounted on platform 49.

Figure 8:
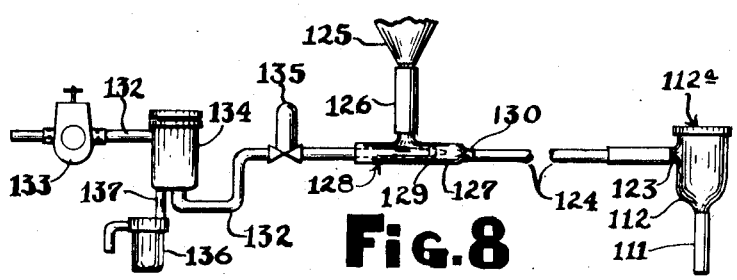
Fig. 8 is an elevational view of a flux feeding assembly forming part of said machine.

Flux is supplied to the flux inlet 123 of flux nozzle 112 by the delivery end of a flexible flux supply tube 124 (Figs. 2 and 8) forming part of a pneumatic flux feed system including a flux dispensing tank 125 mounted on platform 49 (Figs. 2 and 8). The outlet 126 of tank 125 is connected to the outer casing 127 of a syphon or compressed air eductor 128. The casing 127 of syphon or eductor 128 houses a compressed air nozzle 129 and has its discharge end 130 connected to flux supply tube 124. Compressed air is supplied to nozzle 129 through a compressed air supply line 132 equipped with a combined air pressure regulator and gauge 133, an air filter 134 and a solenoid control valve 135. The bottom of the air filter 134 is preferably connected to an automatic trap 136 by pipe connection 137. Flux is drawn from tank 125 into the syphon or eductor 128 by the compressed air discharged through nozzle 129 and is forced along the flexible flux supply tube 124 to flux nozzle 112 which is provided with a screen topped opening 112a through which the compressed air is permitted to escape to atmosphere. This method of supplying flux to the flux nozzle is simple, efficient and reliable and eliminates operating and maintenance troubles which are experienced when the flux is fed from the supply tank to the flux nozzle by mechanical conveying means such as conveyor screws and the like.

Surplus flux left on the work is picked up by a recovery nozzle 138 (Fig. 1) which travels along behind the welding head and is carried by one end of a suction conduit 139 having its other end connected through a strainer 140 to a flux storage tank 141 which is mounted on platform 49 and is provided with a valve controlled bottom discharge outlet 142. Storage tank 141 is suitably connected to the suction side of a fan or impeller 143 driven by an electric motor 144 mounted on platform 49.

A motor driven mechanism is also provided for swinging the welding head assembly 5 to various positions of lateral adjustment about its vertical axis 68 when the previously mentioned guide carriage 107 is dispensed with. As here shown said motor driven mechanism includes a bell crank lever 147 (Figs. 2 and 4) carried by the forward portion of beam 6 and having one arm 148 connected by a link 149 to a bracket arm 150 formed integral with the previously mentioned plate 75 of the welding head assembly. The other arm 151 of bell crank 147 is connected by connecting rod 152 to a rack 153 arranged to slide in a rack guide 154a arranged on platform 49. Rack 153 is driven by the pinion 154 of a speed reducing unit 155 which, in turn, is driven by an electric motor 156 mounted on platform 49. When rack 153 is moved in either direction by its driving pinion 154 it serves, through the agency of the connecting rod 152 and bell crank lever 147 to impart lateral swinging movement to the welding head assembly 5 to thereby effect necessary lateral shifting of the discharge end of the electrode 99 with respect to the work.

An important feature of the invention consists in the provision of the portable control panel 159 shown in Fig. 13. This portable panel comprises a casing 160 mounted on rollers 161 and provided with handle members 162 which enable it to be wheeled to any position by the operator as he inspects and follows the progress of the welding operation. Inside the panel casing 160 are arranged various electrical controls for controlling the operation of the motors through the agency of which the beam 6 is adjusted vertically in relation to the work; for controlling the action of the operating motor of the electrode feed mechanism; for pre-setting the operating speed and controlling the action of the motor driving the mechanism through which longitudinal travelling movement is imparted to said beam; for pre-setting the voltage and amperage characteristics of the welding current and controlling the operation of the welding transformer; for controlling the motor operated mechanism through which the welding head assembly is adjusted about its vertical pivotal axis to keep the electrode centered along the seam with respect to the seam being welded; for controlling the opening and closing of the solenoid valve embodied in the pneumatic flux feed system and for controlling, in the case of circumferential seam welding, the speed and operation of the work rotating mechanism. The details of these controls and the electrical circuits in which they are incorporated to provide for either manual or automatic control of the electrically actuated components of the machine are not specifically shown and described herein since they are not herein claimed as specific features of the present invention.

When the machine described herein is used for circumferential seam welding the work is supported on a suitable electrically operated variable speed work rotating machine which may be controlled manually and/or automatically by operation of certain of the control actuating devices 164 carried by the portable control panel 159. In circumferential seam welding operations the beam 6 is moved longitudinally only to the extent necessary to keep the welding electrode centered on the circumferential seam being welded.

Having thus described the characteristic features of what I now conceive to be the preferred embodiment of my invention, it will be understood that various modifications may be resorted to within the scope and spirit of the invention as defined by the appended claims.

I claim:

1. In a welding machine of the character described, an elongated horizontally extending beam, means mounting said beam for longitudinal movement in a horizontal direction, said means being operable to raise and lower said beam and including a platform to which one end of the beam is attached, a welding head assembly pivotally connected to the other end of the beam by connections affording a vertical axis about which the welding head assembly is swingable to different operating positions and means for swinging said welding head assembly about its vertical axis comprising a bell crank lever pivoted to said beam, link means connecting one arm of the bell crank lever to said welding head assembly, a motor mounted on said platform and motion transmitting means operatively connected to said motor and to the remaining arm of said bell crank lever and functioning in response to operation of said motor to impart swinging movement to said bell crank lever and to said welding head assembly.

2. A welding machine as set forth in claim 1, in which said motion transmitting means comprises a pinion driven by said motor, a rack slidably supported on said platform in mesh with said pinion and a connecting rod connected to said rack and to the said other arm of the bell crank lever.

3. In a welding machine of the character described, a longitudinally and vertically movable beam, a welding head assembly carried by the forward end of the beam, a stationary frame structure, a vertically movable beam-adjusting frame slidably mounted in said frame structure and provided with an opening through which the forward portion of the beam extends, means carried by said vertically movable frame structure for guiding and slidably supporting said beam, electrical motor actuated means for raising and lowering said vertically movable frame and adjustable beam raising and lowering means movable with the rear portion of the beam and operable to raise and lower said rear portion of the beam and indicating means associated with said vertically movable frame and with said last mentioned beam raising and lowering means for indicating the elevation of the front and rear portions of the beam in any vertically adjusted position thereof.

4. A welding machine as set forth in claim 3, in which the means for raising and lowering the rear portion of the beam comprises a platform to which the rear portion of the beam is rigidly secured, vertically extending tubular guides rigidly carried by said platform at opposite sides thereof, ground engaging supporting legs slidably fitted in said guides and provided with ground engaging means at their lower ends, vertically extending screws extending downwardly within said guides in threaded engagement with nuts rigidly secured to the upper ends of said legs, combined thrust and radial bearings carried by said platform and in which the upper ends of said screws are rotatably mounted so as to prevent axial movement of the screws relative to the platform, manually operable means for rotating one of said screws, means connecting said screws together for simultaneous rotation in response to operation of the said manually operable screw rotating means, a pointer carried by and movable vertically with one of said screws and a scale plate over which said pointer is arranged to travel.

5. In a welding machine of the character described, an elongated beam member, means mounting said beam member for longitudinal travelling movement in a horizontal direction lengthwise of the seam being welded, said means comprising a non-travelling vertically adjustable beam-supporting frame through which the beam travels and vertically adjustable mobile beam-supporting means supporting the rear end of the beam and movable therewith, and a welding head assembly comprising a bracket member pivotally connected to and supported by the front end of the beam member through the agency of connecting means affording a vertical pivotal axis about which the bracket is swingable laterally with reference to the line of travel of the beam, an electrode bending head rigidly secured to said bracket and swingable therewith, a conducting bracket rigidly secured to said bending head and having a jaw-carrying portion thereof extending downwardly below the bending head, a pair of contact jaws between which the welding electrode is passed to the work and through which current is supplied to said electrode, said jaws being mounted on the jaw-carrying portion of the conducting bracket in electrical connection therewith and said conducting bracket and jaws being insulated from said bending head, and electrode bending rollers between which the electrode is fed to said jaws, said rollers being mounted in said bending head.

6. In a welding machine of the character described, an elongated beam member, means mounting said beam member for longitudinal travelling movement in a horizontal direction along the length of the seam being welded, said means being operable to raise and lower said beam, an electrode bending head pivotally connected to and supported by the front end of the beam through the agency of connecting means affording a vertical axis about which the bending head is swingable laterally with reference to the line of travel of the beam, a bracket rigidly secured to and depending below said bending head, a pair of contact jaws between which the electrode is passed to the work and through which current is supplied to said electrode, said jaws being mounted on the lower portion of the bracket beneath the welding head and said jaws and bracket being insulated from the welding head, and electrode bending rollers between which the electrode is fed to said jaws, said rollers being mounted in said bending head.

7. In a welding machine of the character described, an elongated horizontally disposed beam, means mounting said beam for longitudinal travelling movement along the length of the seam being welded, a welding head assembly pivotally connected to and supported by the front end of the beam through the agency of connecting means affording a vertical pivotal axis about which the entire welding head assembly is swingable laterally with reference to the line of travel of said beam, said welding head assembly comprising an electrode bending head and a pair of contact jaws supported from and positioned below said bending head, an electrode supply reel from which the electrode is fed to and through said bending head and thence between said jaws to the work, and a power actuated electrode feed mechanism through which the electrode is fed from the reel to said bending head, said reel and feed mechanisms being mounted at the rear end of the beam to travel therewith.

8. A welding machine as set forth in claim 7, including a sectional guide conduit through which the electrode is fed from the feeding mechanism to the bending head, said conduit including a rear section extending forwardly along the beam from the feeding mechanism, a rigid forward section attached to and extending rearwardly from the bending head with its rear end spaced longitudinally from the forward end of the rear section and a flexible tube fitted on and flexibly connecting said rigid sections.

9. In a welding machine of the character described, an elongated horizontally disposed travelling beam movable in the longitudinal direction thereof and along the length of the seam being welded, non-travelling beam supporting means in which the intermediate portion of the beam is slidably supported, a mobile beam support secured to and supporting the rear end of the beam and movable therewith relative to said non-travelling beam supporting means, a welding head assembly pivotally connected to and supported by the front end of the beam through the agency of connecting means acording a vertical pivotal axis about which the entire welding head assembly is swingable laterally with reference to the line of travel of said beam, said welding head assembly including an electrode bending head and a pair of contact jaws supported from and positioned below said bending head, an electrode supply reel from which the electrode is fed to and through the bending head and thence between the contact jaws to the work, and a power actuated electrode feed mechanism through which the electrode is fed from the supply reel to said bending head, said reel and feed mechanisms being mounted on said mobile beam support.

10. A welding machine as set forth in claim 9, in which the non-travelling beam supporting means and the mobile beam support are vertically adjustable to raise and lower the beam and the welding head assembly.

11. In a welding machine of the character described, an elongated horizontally disposed beam, means mounting said beam for travelling movement in the longitudinal direction of the beam and lengthwise of the seam being welded, a welding head assembly pivotally connected to and supported by the front end of the beam through the agency of connecting means affording a vertical pivotal axis about which the entire welding head assembly is swingable laterally with reference to the line of travel of the beam, said welding head assembly including an electrode bending head through which the electrode is fed toward the work, a bracket rigidly secured to and depending below said bending head, a pair of contact jaws between which the electrode is passed from the bending head to the work and through which current is supplied to said electrode, said jaws being mounted on the lower portion of the bracket beneath the bending head, a flux spout surrounding said jaws and having a bottom opening through which the electrode and flux are fed to the work, said spout being rigidly secured to and supported by said bracket, a collar encircling and rotatably supported by said spout, means for releasably securing said collar against rotation relative to said spout, and an electrode guide secured to said collar and arranged to track in the seam being welded, said guide serving to automatically swing the welding head assembly about its vertical pivotal axis to maintain the discharge end of the electrode properly centered with respect to the seam being welded.

12. A welding machine as set forth in claim 9, including motor-actuated beam propelling means mounted on said non-travelling beam supporting means in propelling engagement with said beam and operable to impart longitudinal travelling movement to the beam in either direction.

13. In a welding machine of the character described, an elongated beam member, means mounting said beam member for longitudinal travelling movement in a horizontal direction, said means being operable to raise and lower said beam member, a welding head assembly pivotally connected to one end of said beam member by connecting means affording a vertical axis about which the welding head assembly is swingable laterally to different operating positions, said welding head assembly including a conducting bracket to which the welding current conductors are electrically connected, a pair of contact jaws between which the welding electrode is passed to the work and through which current is supplied to said electrode, said jaws being mounted on said conducting bracket in electrical connection therewith, and electrode bending rollers mounted on and insulated from said bracket and positioned above said jaws and means for swinging the welding head assembly about its vertical axis comprising a motor mounted on a platform to which the end of the beam remote from the welding head assembly is attached, a rack operating pinion geared to said motor, a rack slidably mounted on said platform in mesh with said pinion and means interlinking said rack and said welding head assembly and functioning to swing the welding head assembly about its vertical axis in response to movement of said rack by said motor and said pinion.

14. In a welding machine of the character described, an elongated beam member, means mounting said beam member for longitudinal travelling movement in a horizontal direction lengthwise of the seam being welded, a welding head assembly pivotally connected to and supported by the front end of the beam member through the agency of connecting means affording a vertical pivotal axis about which the welding head assembly is swingable laterally with reference to the line of travel of the beam, a platform to which the end of the beam remote from the welding head assembly is attached, and means for swinging the welding head assembly about its vertical axis, comprising a motor mounted on said platform, a rack operating pinion geared to said motor, a rack slidably mounted on said platform in mesh with said pinion, and means interlinking said rack and welding head assembly and functioning to swing the welding head assembly about its vertical axis in response to movement of said rack by said motor and said pinion.

LEO BRAUN.

References Cited in the file of this patent

UNITED STATES PATENTS

| Number | Name | Date |
|---|---|---|
| 1,073,149 | Lawrence | Sept. 16, 1913 |
| 1,161,366 | Wohlrab | Nov. 23, 1925 |
| 1,566,325 | Hansen | Dec. 22, 1925 |
| 2,105,079 | Holslag | Jan. 11, 1938 |
| 2,189,399 | Lewbers | Feb. 6, 1940 |
| 2,357,376 | Baird | Sept. 5, 1944 |
| 2,367,257 | Baird | Jan. 16, 1945 |
| 2,390,560 | Stanley et al. | Dec. 11, 1945 |
| 2,432,495 | Baird | Dec. 16, 1947 |
| 2,438,593 | Wright | Mar. 30, 1947 |
| 2,460,914 | Wright | Feb. 8, 1949 |